W. E. BOCK.
CAGE FOR ROLLER BEARINGS.
APPLICATION FILED AUG. 31, 1914.

1,177,599.

Patented Apr. 4, 1916.

WITNESSES:

INVENTOR
William E. Bock
BY
Whittemore Hulbert & Whittemore
ATTORNEYS

UNITED STATES PATENT OFFICE.

WILLIAM EMIL BOCK, OF TOLEDO, OHIO.

CAGE FOR ROLLER-BEARINGS.

1,177,599.  Specification of Letters Patent.  Patented Apr. 4, 1916.

Application filed August 31, 1914. Serial No. 859,430.

*To all whom it may concern:*

Be it known that I, WILLIAM E. BOCK, a citizen of the United States of America, residing at Toledo, in the county of Lucas and State of Ohio, have invented certain new and useful Improvements in Cages for Roller-Bearings, of which the following is a specification, reference being had therein to the accompanying drawings.

The invention relates to cages for roller bearings and comprises the construction as hereinafter set forth.

Figure 1:
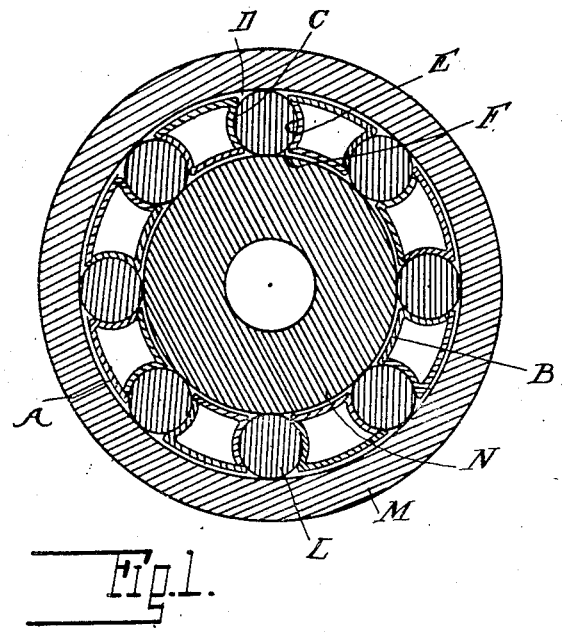
Figure 2:
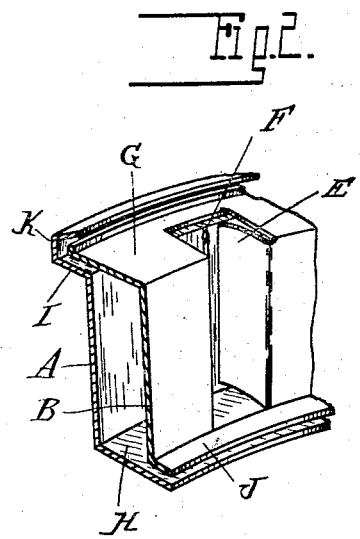
Figure 3:
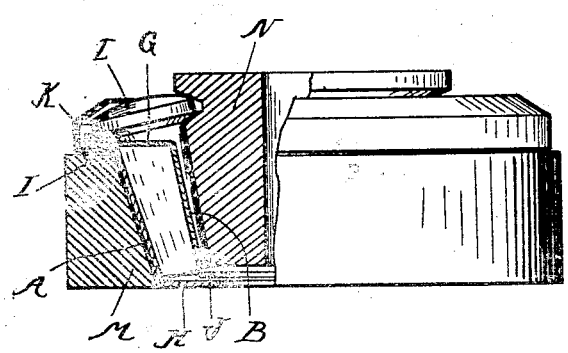

In the drawings: Figure 1 is a section through the cage in the plane of rotation; Fig. 2 is a sectional perspective view of a portion of the cage; and Fig. 3 is a cross section showing the cage in engagement with the rollers of a roller bearing.

My improved cage comprises essentially two concentric annular sheet metal members spaced from each other and cross connected by laterally-extending flanges. Each of these members is formed with struck-out portions bent into segmental form, and these segments are arranged in pairs so as to embrace the respective rollers, while the apertures formed by the bending of the segments provide clearance for the rollers at the points of contact with the race members.

In detail, A is an outer annular member and B is an inner annular member arranged concentrically in relation to each other. The outer member A is formed with a series of inwardly deflected segments C struck out from apertures D, and in the same manner the inner member B is provided with segments E struck out from apertures F. Above and below these segments and apertures are laterally-extending flanges G and H respectively upon the inner and outer member, which form cross connections therebetween. The flange G is preferably formed to overlap an outwardly-extending flange I on the member A, and the flange H overlaps an inwardly-extending flange J on the member B. The flange I is further provided with a portion K which, when the bearing is assembled, is spun or otherwise turned over the end of the roller L to form a retainer therefor. Thus, as shown in Fig. 1, when the rollers L are inserted in the apertures formed by the struck-out portions they will be embraced by the opposite segments E and C, which will center and aline the same, while opposite portions of the periphery of each roller will project through the apertures D and F into contact with the race members M and N.

What I claim as my invention is:—

1. A cage for roller bearings, comprising a pair of concentrically-arranged spaced annular members having portions thereof struck out oppositely to form pockets for the rollers, the struck-out portions being fashioned to form segmental bearings embracing the rollers.

2. A cage for roller bearings, comprising a pair of spaced concentrically-arranged annular members, laterally-extending flanges at opposite ends of said members for connecting the same, and oppositely struck-out portions of said members providing pockets for the reception of the rollers and fashioned to form opposed segmental bearings embracing said rollers.

3. A cage for roller bearings, comprising a pair of spaced annular sheet metal members concentrically arranged and provided with laterally-extending flanges at the opposite ends for cross connecting the same, a series of outwardly struck portions on the inner member and a corresponding series of inwardly struck portions on the outer member, said oppositely struck portions forming opposed segmental bearings in the space intermediate said annular members adapted to embrace and position the rollers, and the apertures from which said portions are struck out providing clearance for the contact of said rollers with the race members.

4. A cage for bearings, comprising a pair of concentrically-arranged spaced annular members having portions thereof struck out oppositely to form pockets for the rollers, the struck-out portions being fashioned to form bearings for the rollers.

In testimony whereof I affix my signature in presence of two witnesses.

WILLIAM EMIL BOCK.

Witnesses:
 JAMES P. BARRY,
 PHYLLIS COBURN.